Jan. 16, 1934.  W. D. FOSTER  1,944,028
FILM HANDLING APPARATUS
Filed May 26, 1932  2 Sheets-Sheet 1

INVENTOR.
WARREN DUNHAM FOSTER.
BY Warren D. Foster
ATTORNEY.

Jan. 16, 1934.  W. D. FOSTER  1,944,028
FILM HANDLING APPARATUS
Filed May 26, 1932   2 Sheets-Sheet 2
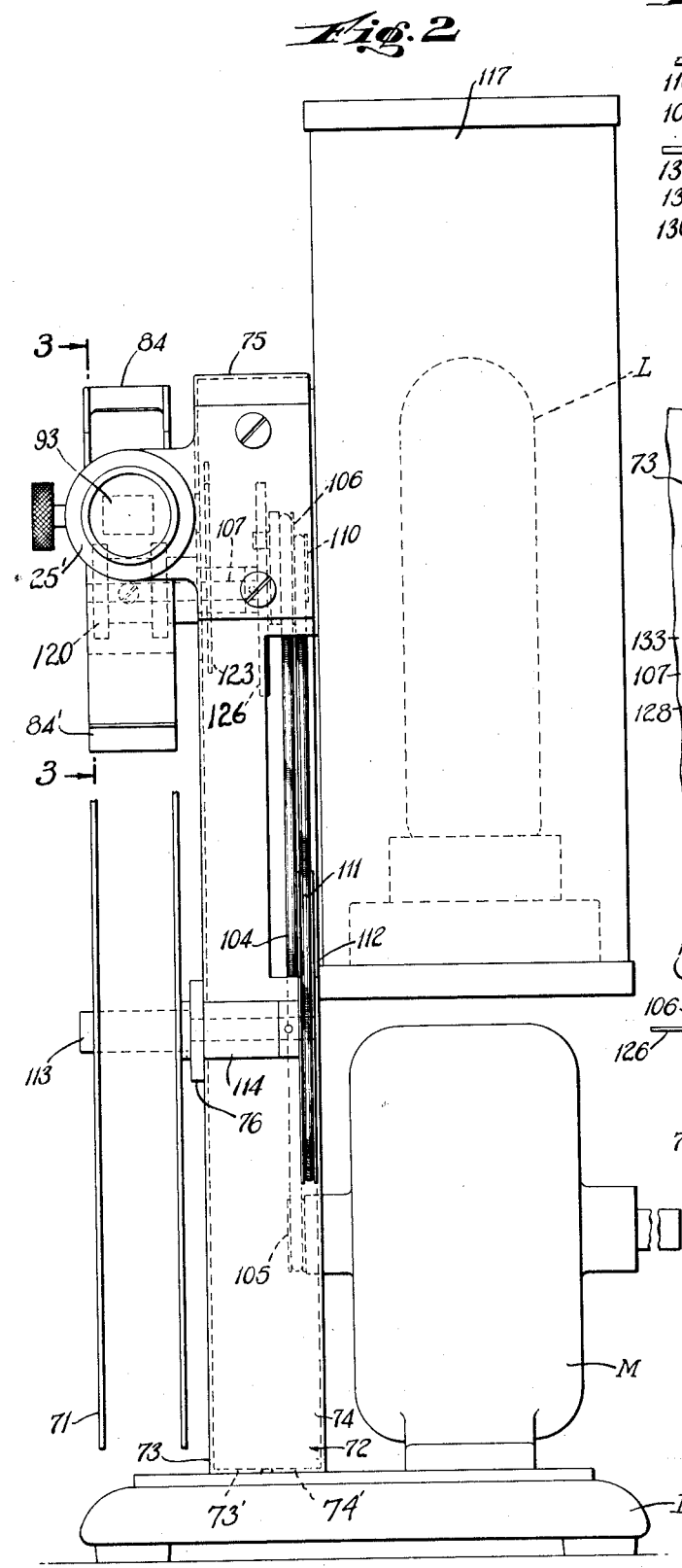
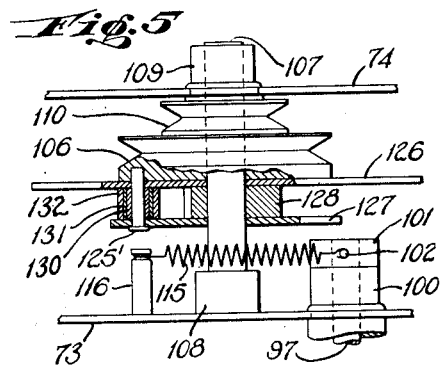
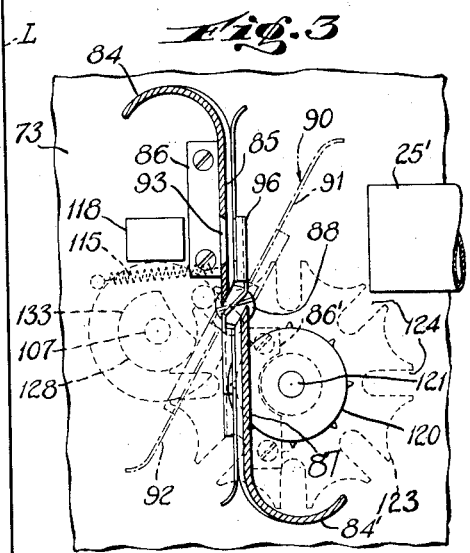
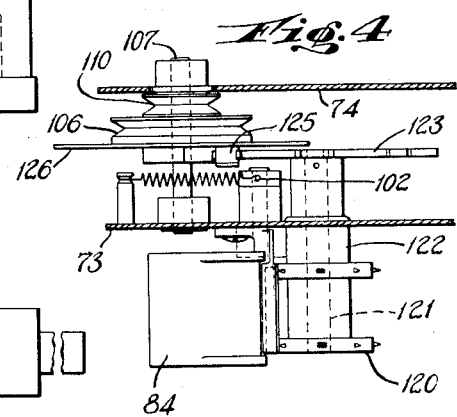
INVENTOR.
WARREN DUNHAM FOSTER.
BY Warren D. Foster
ATTORNEY.

Patented Jan. 16, 1934

1,944,028

UNITED STATES PATENT OFFICE 1,944,028

FILM HANDLING APPARATUS

Warren Dunham Foster, Washington Township, Bergen County, N. J., assignor to Kinatome Patents Corporation Application May 26, 1932. Serial No. 613,662

21 Claims. (Cl. 88—17)

The present invention relates broadly to film handling apparatus and more particularly to apparatus for projecting or photographing motion pictures with or without provision for the reproduction or recordation of sound.

One object of the present invention is to provide an improved projector or camera which can be easily operated by amateurs and can be inexpensively constructed. A further object of the invention is to provide a simple projector of a relatively few parts compactly arranged so that the apparatus will occupy but a small amount of space when boxed for shipment from the factory or when being stored or transported by the user.

A further object of the invention is to provide an inexpensive projector arranged for use with means for feeding the film which dispense with the usual upper and lower loops which often give trouble especially in machines operated by amateurs.

Another important object of the present invention is to provide means for utilizing the shutter of a motion picture machine for driving the intermittent film feeding means and thereby reduce the size, weight, and manufacturing costs of the apparatus. To accomplish this purpose, the pin which operates the star wheel of a Geneva-type movement is fastened on the shutter which is suitably mounted for such purpose adjacent the feeding mechanism, and means are provided for directing a beam of light to the aperture so that the path of the beam is intersected by the shutter.

Another object of my invention is to provide an inexpensive motion picture apparatus using the Bundick and Proctor tension control method for feeding the film wherein a member which functions to produce the required tension in the film is also arranged for serving in other ways in the apparatus thereby reducing the number of parts and manufacturing costs of the apparatus. To accomplish this purpose, I employ a member having a curved resilient tension producing portion over which the film passes from the delivery reel to the intermittent feeding means. Another portion of this member is constructed to form an upper fixed gate section, another portion forms a lower fixed gate section, and another portion serves to produce the desired condition of tension between the lower end of the gate and the take up reel. It will therefore be understood that a single piece of spring metal, suitably relieved in the center as by surface grinding, may serve both for tension arms and for forming, if desired, the resilient member of the gate. By supporting the portion of such spring metal, which forms one gate section, back of its central portion only, its outside edges, which bear against the film, will have the resilience which is necessary in the gate.

According to an advantageous feature of my invention, a gate structure is employed which includes a single pivoted gate section arranged for pressing the film against the fixed section of the gate. This pivoted gate section is so constructed that it facilitates lateral threading of the film through the gate.

Another advantageous feature of the present invention resides in the provision of collapsible bracket arm supports for both the delivery reel and the take up reel. By said construction, the over all breadth of an apparatus embodying my invention may be reduced when the machine is encased for transportation from the factory or is stored by the user.

Another advantageous feature of my invention resides in the provision of an improved mounting frame made from a single piece of sheet metal bent to form two parallel mounting plates spaced apart to form an enclosure within which nearly all of the moving parts of the apparatus are mounted wherein they are out of sight and, more important, out of reach of amateur operators, especially children.

While I show in the accompanying drawings which form a part of this specification my invention embodied in one form of motion picture apparatus, it will be understood that certain features of the invention may be embodied in other widely different forms of film handling apparatus without departing from the spirit of my invention and the scope of my broader claims.

Figure 2 is an enlarged partial end view of the structure shown in Figure 1, showing, however, a modified form of spindle mounting.

Figure 3 is a view showing a section taken along the line 3—3 of Figure 2 and looking in the direction of the arrows.

Figure 4 is a partial top view of the structure shown in Figure 3.

Figure 5 is an enlarged fragmentary top view, shown partly in section, of certain parts of the structure of Figure 4 illustrating a preferred form of construction of an improved quiet driving mechanism for the intermittent film feeding means.

Figure 7:
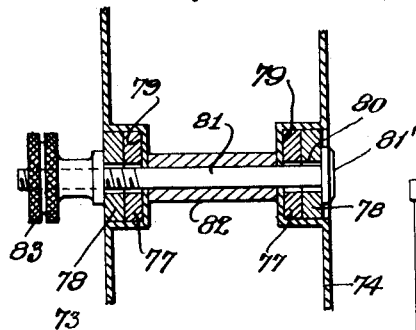
Figure 7 is a detail view showing a preferred construction of means for mounting reel carrying brackets on the frame.

A delivery reel 70 and a take up reel 71 may each be mounted on a bracket which extends out from opposite sides of a mounting frame generally designated as 72 which may be constructed of a single piece of sheet metal to include a front mounting plate 73 and a rear mounting plate 74 spaced away from the plate 73, and a top member 75 integrally joining the plates 73 and 74. The frame 72 may be mounted on the base B by any suitable fastening means or by means of integral inturned flange elements on the bottom edge portions of the plates 73 and 74, these flange elements being designated 73' and 74' respectively. If desired, the base B may be omitted and the flanges 73' and 74' turned outwardly to serve as a supporting base, in either form, supporting resilient feet preferably being provided. In the form shown in Figure 2, the delivery and the take up reels may each be mounted on a bracket arm 76 which may be fastened in any suitable way to the frame 72 so as to extend out from each side thereof.

Figure 1:
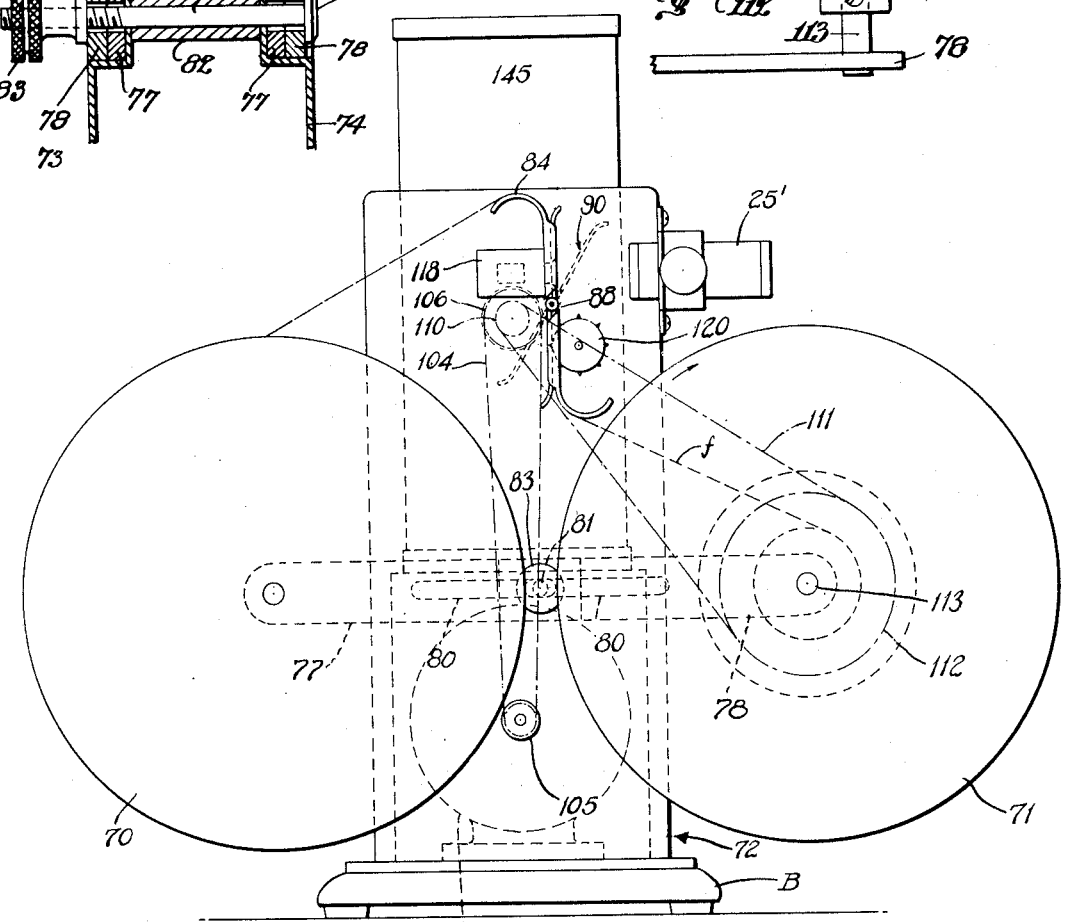
Figure 1 is a side view of my invention as embodied in a motion picture projector.
Figure 6:
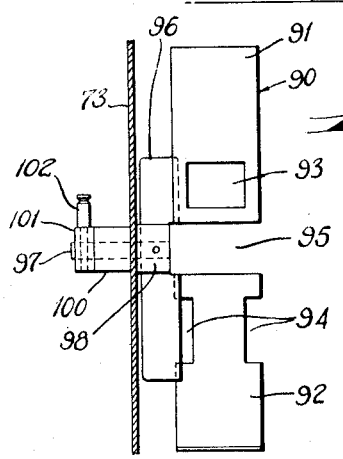
Figure 6 (sheet 1) is a detail view showing a preferred means for pivotally mounting the movable gate.

According to a preferred means for mounting the reels, the bracket for the delivery reel may include two parallel plate members 77 and the bracket for the take up reel may include two parallel plate members 78 (see Figures 1 and 7). It is a feature of my invention to fasten the reel-supporting brackets on the frame 72 compactly and in a way that they may be collapsed or withdrawn into the frame for reducing the over all width of the projector. Means for carrying out this feature include the provision of rectangular channels or slot elements 79, formed in the mounting plates 73 and 74 parallel to the base B a short distance thereabove, each of which channels is constructed to receive the bracket plate 77 and the bracket plate 78 with a sliding fit. This construction keeps the center of gravity of the apparatus low and thus increases its stability. These bracket plates extend in opposite directions outwardly from the frame 72, thus providing a pair of spaced bracket plates on each side of the frame 72. Each of the plates 77 and 78 is provided with a long lengthwise slot 80 adjacent its inner end and a bolt 81 having a head 81' wider than the slot 80 extends through the slots in the bracket plates supported on the rear mounting plate 74, thence through oppositely disposed holes in the inner walls of the channels 79, and thence through the slots in the bracket plates supported on the front mounting plate 73. A sleeve 82 may be disposed around the bolt 81 so as to fit closely between the inner walls of the channels 79, and a thumb nut 83 threaded on the front end of the bolt is effective when tightened up to bind the bracket plates together and also binds the inner plates against the mounting frame 72. Therefore it can be seen by inspection of Figures 1 and 7 and consideration of the above described construction that the paired bracket plates 77 and 78 can be held on the frame 72 in rigid relation thereto when supporting the delivery and take up reels on their outer ends to which the reels will be mounted in a way presently to be described. Also it can be seen that by unloosening the nut 83 all the bracket plates 77 and 78 can be easily slid inwardly and the over all shipping and storage width of the apparatus considerably reduced.

Figure 8:
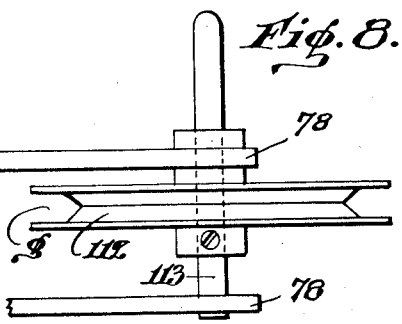
Figure 8 is a detail view showing a preferred way of mounting the spindle for the take up reel on two extensible bracket arms.

When the bracket arms 78 and 77 are slid inwardly, as when packing the apparatus for shipment, it is desirable that the belt 111 (later described) be not disengaged from the pulley 112. To this end, the belt 111 is made of spring wire in the usual way and the pulley 112 which may be mounted on the spindle 113 in the bracket arms 78 (see Figure 8) has a deeper groove g than usual, and when the arms 78 are unloosened and slid inwardly, the belt 111, which will ordinarily be under some tension, will contract as the pulley 112 moves in and therefore remain in place on the pulley, as is desirable.

It will be readily understood that the above described construction makes it possible for different sizes of reels to be used and the reel-supporting arms so adjusted that the over-all size of the projector is no larger than is necessary for the particular reel then being employed.

For feeding film f through the form of projector illustrated herein, by compactly disposed means which dispense with unsupported loops of slack film, the film passes from the delivery reel to a curved flexible guiding, tensioning and auxiliary feeding member 84 integrally joined to an upper straight portion 85 of a fixed gate section which portion may have an integral mounting plate 86 fastened to the mounting plate 73 by ordinary screws or other suitable means. (See Figure 3.) The curved portion 84 is flexible enough to serve to maintain a suitable condition of tension in the film as it is drawn over the guide portion 84 by feeding means to be described hereinafter.

The fixed gate section may include a lower straight portion 87, which, as shown in Figure 3, is offset to the right from the upper straight portion 85 so that the right face of the upper portion 85 and the left face of the lower portion 87 each defines an opposite side of adjacent sections of the film work path. To permit the film to pass along the right face of the gate portion 85 and the left face of the gate portion 87, a central portion of the fixed gate section is cut away at 88 and the film may pass from the upper portion 85 to the lower portion 87 without bending.

To the lower end of the lower gate portion 87 will be integrally joined a similar curved flexible guide portion 84' which may be a substantial duplicate of the upper curved guide portion 84 except that it is turned in the opposite direction. The lower portion 84' will function similarly to the upper portion 84 to maintain suitable tension in the film between the lower end of the gate and the take up reel. The upper portion 85 and the lower portion 87 and the curved portions 84 and 84' will each be relieved in a usual way to prevent scratching the film. The lower gate portion 87 may have an integral flange portion 86' by which it may be fastened to the mounting plate 73.

The functioning of these tension members is fully described in the copending application of Clarkson Ulysses Bundick and Barton Allen Proctor, Serial Number 44,482, filed July 18, 1925.

For cooperation with the above described fixed gate section, I provide a movable gate section generally designated as 90, which includes an upper portion 91 having a work face for cooperation with the upper gate portion 85 and a lower portion 92 having a work face for cooperation with the gate portion 87. The upper gate portions 85 and 91 each have apertures 93 which register with each other when the movable gate portion 91 is disposed against the fixed gate portion. The lower gate portion 92 may have sections cut away at 94 for receiving teeth of a film feeding means to be presently described. The lower fixed gate portion 87 may have cut out portions which will correspond to the cut out portions 94.

To permit the passage of the film along the left face of the upper gate portion 91, and the right face of the lower gate portion 92, a central portion of the movable gate section 90 is cut away at 95, corresponding to the cut-away portion 88 of the fixed gate section. For movably mounting the gate section 90 so that it will co-operate with the fixed gate portions 85 and 87, a centrally disposed integral extension 96 is provided on the rear edge of the gate section 90 on both sides of the cut out portion at 95. The extension 96 is slightly offset from the planes of the upper gate portion 91 and the lower gate portion 92, as indicated in Figure 3, and these offset portions of the extension 96 are bent to coincide with a diametrical plane through a stub shaft 97 on which the gate section 90 is mounted. To fasten the gate section on the stub shaft 97, a relatively thick collar 98 is fitted on the end of the shaft and a diametrical slot cut through the collar and the shaft for receiving the extension 96 with a tight fit. The extension may be fastened as by riveting to the shaft 97 and the collar 98. A bearing bushing 100 may be fastened securely on the mounting plate 73 for receiving the shaft 97, and this shaft and the gate section 90 are held in place on the bushing 100 by placing a collar 101 on the inner end of the shaft and fastening the collar by means of a pin 102, which may extend upwardly a short distance. An extensible spring 115 has one end fastened to the pin 102 and its other end fastened to a pin 116 in the plate 73 and the spring is effective to hold the gate section 90 in operative closed position against the fixed gate section with their apertures in register with each other.

The co-pending application of Frederic Davenport Sweet and Warren Dunham Foster, Serial Number 613,600 filed May 26, 1932 described and claims the form of gate which is described above and also other forms of gate which may be employed in certain cases with this invention.

According to one means which may be employed for operating the projector, a motor M may be mounted on the base B on the rear side of the frame 72 and a belt 104 may pass from a driving pulley 105 mounted on the motor shaft which passes through the rear mounting plate 73, and engage with a driven pulley 106 on a shaft 107 which may be mounted in bearing bushings 108 and 109 mounted on the plates 73 and 74 respectively. Mounted on the shaft 107 adjacent the pulley 106 is provided a second pulley 110, which may be connected by a spring belt 111 with a pulley 112 which may be mounted on the spindle 113 of the take up reel 71. This spindle may be rotatably mounted on the brackets 76 by means of a suitable bearing bushing 114 of well known construction.

For securing a smaller and more compact projector and obtaining other advantages presently to appear, a usual lamp L may be disposed in a lamp house 117 which may be mounted on the opposite side of the frame 72 from the reels 70 and 71 and light from such lamp may be deflected to the film at the aperture by means of a suitable prism or mirror 118 mounted on the frame 72 in alignment with objective lens 25' mounted on the plate 73.

Means for feeding the film through the apparatus may include a usual sprocket 120 mounted on a shaft 121 which may be rotatably mounted in a bushing or journal 122 fastened on the plate 73 adjacent the gate structure described above. To the inner end of the shaft 121 may be fastened a star wheel 123 of a Geneva-type movement which star wheel will preferably have more than the usual number of slots 124 for coaction with a pin 125.

It is a feature of the present invention to drive a film feeding sprocket by a compact organization of a Geneva movement and a shutter 126, and to this end a pin 125 will be securely fastened to the shutter which is mounted on the shaft 107 against the pulley 106 (see Figure 4). The star wheel 123 is compactly disposed in a plane closely adjacent and parallel to the plane of the shutter 126.

It is a further feature of the present invention to reduce the noise of operation of the feeding means and for this purpose a quiet mounting for a pin 125', corresponding to the pin 125, which includes an auxiliary mounting disc 127 on a hub 128 disposed around the shaft 107 forwardly from the shutter 126. As illustrated in Figure 5, the pin 125' is supported in part by the disc 127 and by the shutter 126 and by the pulley 106 which is disposed against the shutter or formed integrally therewith, and is therefore held securely against working loose. To decrease the noise of operation the following construction is preferred: In apparatus not to be subjected to a great amount of use a fibre sleeve 130 may loosely encircle the steel pin 125', a steel sleeve or ring 131 encircle the fibre sleeve 130, and a fibre sleeve 132 enclose the steel sleeve 131. The three above mentioned sleeves may fit tightly together and form a structure which rotates freely around the pin 125', thus reducing the wear on the sleeve 132 by the star wheel 123 as well as decreasing the noise of operation because the fibre sound reducing sleeves 130 and 132 tend to deaden sound vibrations. Or if desired to give greater rigidity to the driving unit, the sleeves 130 and 131 may fit tightly and the outer fibre sleeve 132 revolve about the steel sleeve 131. In apparatus which is to be subjected to greater wear, the outer ring 132 may be constructed of steel, the intermediate ring 131 of fibre, and the inner ring 130, revolving upon the pin 125', of a metal alloy which ordinarily does not require lubrication often. Alternately, the intermediate ring 131 may be made of brass and the inner ring 130, of fibre. In any of the above arrangements, the different characteristics of the various materials in juxtaposition with each other will retard sound and other vibrations. The hub portion 128 has a usual dwell segment 133 for cooperation with the star wheel to hold it stationary while the film is at the aperture.

If desired, any other effective type of intermittent movement may be employed.

Certain advantages of my invention have been set forth above and throughout the description. Other advantages result from the construction and mounting of the pivoted gate section in relation to the film feeding means so that the gate may be moved away from the film feeding sprocket to a film threading position and back again to a film feeding position by simple angular movement of the pivoted gate section.

Other advantages result from the coaction of the stiffening member and the rear wall of the bracket channels in the mounting plates so that bracket arms of each side may be squeezed against the thin mounting plates without pushing them out of true.

Still other advantages result from the provision of two bracket arms for supporting the reel spindles so that the take up reel pulley and the rewinding or delivery reel pulley (when used) can be more securely mounted between the bracket arms than on the side of one bracket arm.

I claim:

1. In a film handling apparatus, in combination, a mounting frame, a delivery reel disposed adjacent the base of said frame, a take up reel disposed in the same horizontal plane and the same vertical plane as said delivery reel, an apertured gate, means for feeding the film from one of said reels to the other through said gate and past the aperture thereof, said gate and said feeding means being disposed upon said mounting frame, extensible bracket members extending out from each side of said frame for supporting said reels, said frame being formed with a channel element for cooperation with said bracket members and said bracket members being seated in said channel element, and means including a single releasable member for binding said bracket members against said frame in a plurality of positions.

2. In a film handling apparatus having a delivery reel, a take up reel, and an apertured gate, means for feeding the film from one of said reels to the other through said gate and past the aperture thereof, said gate and said feeding means being disposed upon said mounting frame, in combination, a mounting frame, adjustable supporting means for mounting said reels on said frame in the same horizontal plane for movement toward and away from said frame, said means including a pair of extensible parallel arms extending out from one side of said frame, and a second pair of extensible parallel arms extending out from the opposite side of said frame.

3. In a film handling apparatus having a delivery reel, a take up reel, and an apertured gate, means for feeding the film from one of said reels to the other through said gate and past the aperture thereof, said gate and said feeding means being disposed upon said mounting frame, a mounting frame having means on said frame for supporting said reels in the same horizontal plane adjacent the base of said frame, said means including a bracket member extending out from each side of said frame, the weight of one of said bracket members and the reel supported thereon being effective substantially to counter balance the weight of the other of said bracket members and the reel supported thereon.

4. In a film handling apparatus, in combination, a mounting frame having a front and a rear upright mounting plate spaced apart, a delivery reel, a take up reel disposed in the same horizontal plane and the same vertical plane as said delivery reel, an apertured gate, means for feeding the film from one of said reels to the other through said gate and past the aperture thereof, said gate and said feeding means being disposed upon said mounting frame, a pair of extensibly mounted bracket plates extending out from one side of said frame for supporting said delivery reel, a pair of extensibly mounted bracket plates extending out from the opposite side of said mounting frame for supporting said take up reel, said front mounting plate and said rear mounting plate each being formed with a horizontal channel element which is disposed in the same horizontal plane and constructed for cooperation with each pair of bracket members, each of said bracket members being formed with a lengthwise slot, a bracing member extending between the rear wall of said channel elements and aligned with said slots, said channel elements each having a hole in its rear wall aligned with said slots and disposed adjacent said bracing member, and means for fastening said bracket members on said mounting frame, said fastening means including a threaded bolt having a head larger than said slots, said bolt extending through said slots and said holes, said fastening means further including a nut member to be threaded on the end of said bolt opposite its head for binding said bracket members against each other and against said bracing member.

5. In a film handling apparatus having intermittent film feeding means and mechanism for driving said feeding means including a cam device, a continuously revolving pin member for driving said cam device intermittently, said pin including a metallic centrally disposed core element, a sleeve of non-metallic vibration damping material encircling said core, a metallic sleeve encircling said non-metallic sleeve, and a non-metallic vibration damping sleeve encircling said metallic sleeve.

6. In a film handling apparatus, in combination, a gate having an aperture past which a film may be moved, a source of light disposed at one side of the optical axis of said gate, a member for deflecting light from said source through the film at said aperture, a sprocket for feeding the film past said gate, a shutter revolving upon an axis parallel to the axis of that portion of the light rays extending between said source and said deflecting member for intercepting the light from said source, means for continuously rotating said shutter, and a driving connection between said shutter and said sprocket mounted on said shutter for operating said sprocket intermittently by the continuous rotation of said shutter.

7. In a film handling apparatus, in combination, a rotatable shutter, a sprocket, and means for rotating said sprocket intermittently, said means including a Geneva movement the driving member of which is mounted upon said shutter for movement therewith.

8. In a film handling apparatus, a source of light, a continuously rotating shutter, said shutter including a blade which intercepts light from said source at right angles to the optical axis thereof upon the revolution of said shutter, a member for feeding a film across the path of light from said source, and means for intermittently driving said feeding member, said means including a driven and a driving member, said driven member being attached to said feeding member for revolution therewith and said driving member extending from said blade of said shutter in a direction parallel to the axis of rotation thereof and being brought by the rotation of said blade into a position wherein it engages and moves said driven member whereby the rotation of said shutter drives said feeding member.

9. In a film handling apparatus including a gate having an aperture, a source of light at one side of the axis of said aperture, and means for deflecting light from said source to a film at said aperture, the combination of a continuously rotating shutter for interrupting said light, a film engaging member for intermittently feeding the film past said aperture, an operating shaft for said feeding member extending toward said shutter, a member mounted upon said shaft adjacent said shutter for operating said feeding member, and a pin device mounted directly upon said shutter for revolution therewith for driving said operating member, said pin device including a metal pin fastened in a blade of said shutter and projecting therefrom into the plane of said operating member, and a relatively close fitting sleeve mounted upon said pin and bodily movable therewith and rotatable relatively thereto for engaging said operating member and communicating motion thereto.

10. The structure described in claim 9, characterized by said sleeve mounted upon said pin being constructed of a material having a substantially different sound vibration characteristic from said pin whereby noise is reduced.

11. The structure described in claim 9, characterized by said pin having mounted thereon a non-metallic encircling ring, a metallic ring encircling said non-metallic ring, and a non-metallic ring encircling said metallic ring, said non-metallic rings being constructed of material having different coefficients of vibration than that of the metal of which said pin and said metallic ring are composed.

12. The structure described in claim 9, said sleeve mounted upon said pin for bodily movement therewith and rotational movement relatively thereto being characterized by a non-metallic section in engagement with said pin, another non-metallic section in engagement with said operating member, and an intermediate metallic section positioned between said non-metallic sections.

13. In a film handling apparatus having an intermittent feeding means and mechanism for driving the same including a Geneva movement star wheel, a continuously revolving pin member for cooperation with said star wheel, said pin member including a metallic centrally disposed round core element, a sleeve of non-metallic material encircling said core and revoluble with respect thereto and therewith, a metallic sleeve encircling said non-metallic sleeve, the material of said non-metallic sleeve having a different sound damping characteristic than the metal in said core and in said metallic sleeve, said sleeves fitting tightly one with the other.

14. In a film handling apparatus having an intermittent film feeding means and mechanism for driving said means including a cam device, a continuously revolving pin member for cooperation with said cam device, said pin including a metallic centrally disposed round core, a sleeve of metallic material encircling said core and revoluble therewith and relatively thereto, another metallic sleeve in engagement with said cam device, and a non-metallic sleeve having vibration damping characteristics interposed between said metallic sleeves.

15. The structure described in claim 9, said sleeve mounted upon said pin for bodily movement therewith and rotational movement relatively thereto being characterized by a metallic section in engagement with said pin, another metallic section in engagement with said operating member, and a non-metallic section intermediate said metallic sections.

16. In a film handling apparatus, in combination, a continuously rotating shutter, a sprocket, and means for operating said sprocket intermittently, said operating means including a star wheel co-axially mounted relative to and connected with said sprocket for rotation therewith, and a pin mounted upon said shutter and rotating therewith for driving said star wheel.

17. In a film handling apparatus, in combination, a gate having an aperture past which a film may be moved, a source of light disposed at one side of the optical axis of said gate, a member for directing light from said source through the film at said aperture, a rotatable shutter mounted between said light source and said deflecting member, means for intermittently feeding the film past said aperture in cooperation with said shutter, and a driving mechanism on said shutter for operating said feeding means.

18. In a film handling apparatus, in combination, a mounting frame having a base which is short and narrow relative to the height of said apparatus, means for mounting a delivery reel on said apparatus adjacent said base, means for mounting a take-up reel on said apparatus in approximately the same horizontal plane and in the same vertical plane as said delivery reel so that the film may pass operatively from one of said reels to the other without twisting and so that the center of gravity of the apparatus remains the same distance from the base thereof irrespective of whether the film is wound on the delivery reel or on the take-up reel, and laterally extensible means operable for mounting both of said reel mounting means on said apparatus and operable to be withdrawn within the area of said short and narrow base when said apparatus is not in use, whereby said apparatus then may be stored to occupy a horizontal area relatively small with respect to the height of said apparatus.

19. In a film handling apparatus, in combination, a mounting frame, a delivery reel mounted on said frame adjacent the base thereof, a take up reel mounted on said frame in the same horizontal plane as said delivery reel and in the same vertical plane as said delivery reel, an apertured gate, means for feeding the film from one of said reels to the other through said gate and past the aperture thereof, said gate and said feeding means being disposed upon said mounting frame, extensible bracket members extending out from each side of said frame for supporting said reels, said frame having a supporting channel element formed therein for cooperation with said bracket members, and releasable means for fastening said bracket members to said frame in a plurality of positions.

20. In a film handling apparatus, in combination, an upright mounting frame having a relatively narrow base, a delivery reel and a take up reel, brackets fastened to said frame and extending out from each side thereof for supporting in the same horizontal plane said delivery and said take up reels at substantially a minimum distance above said base, means disposed between said reels in the vertical plane thereof for feeding the film from one of said reels to the other thereof, a motor mounted on the lower portion of said frame for driving said feeding means, a housing for a source of light mounted on said frame on the opposite side thereof, said reels and said motor and said lamp housing cooperating for increasing the stability of said film handling apparatus without increasing the width of its base.

21. In a film handling apparatus, in combination, a mounting frame having a base which is short and narrow relative to the height of said apparatus, laterally extensible means effective in extended position for supporting a delivery reel on said apparatus, said reel projecting outwardly from said base at one side thereof, laterally extensible means effective in extended position for supporting a take-up reel on said apparatus in approximately the same horizontal and vertical planes as said delivery reel, said take-up reel projecting outwardly from said base on the side opposite said delivery reel, means supported on said frame for feeding the film from one of said reels to the other without twisting it, means for guiding the film from said delivery reel to said feeding means, and means for guiding the film from said feeding means to said take-up reel, said feeding means and both of said guiding means being positioned above a line joining the axes of said reels and being disposed within the space directly above said base, and means for mounting both of said extensible reel supporting means for movement inwardly within the space above said short and narrow base when said apparatus is not in use, whereby said apparatus may be stored thereafter to occupy a relatively small floor space with respect to the height of said apparatus.

WARREN DUNHAM FOSTER.